E. A. HYDE.
ROAD GRADING MACHINE.
APPLICATION FILED FEB. 11, 1915.
1,170,269.
Patented Feb. 1, 1916.
6 SHEETS—SHEET 3.
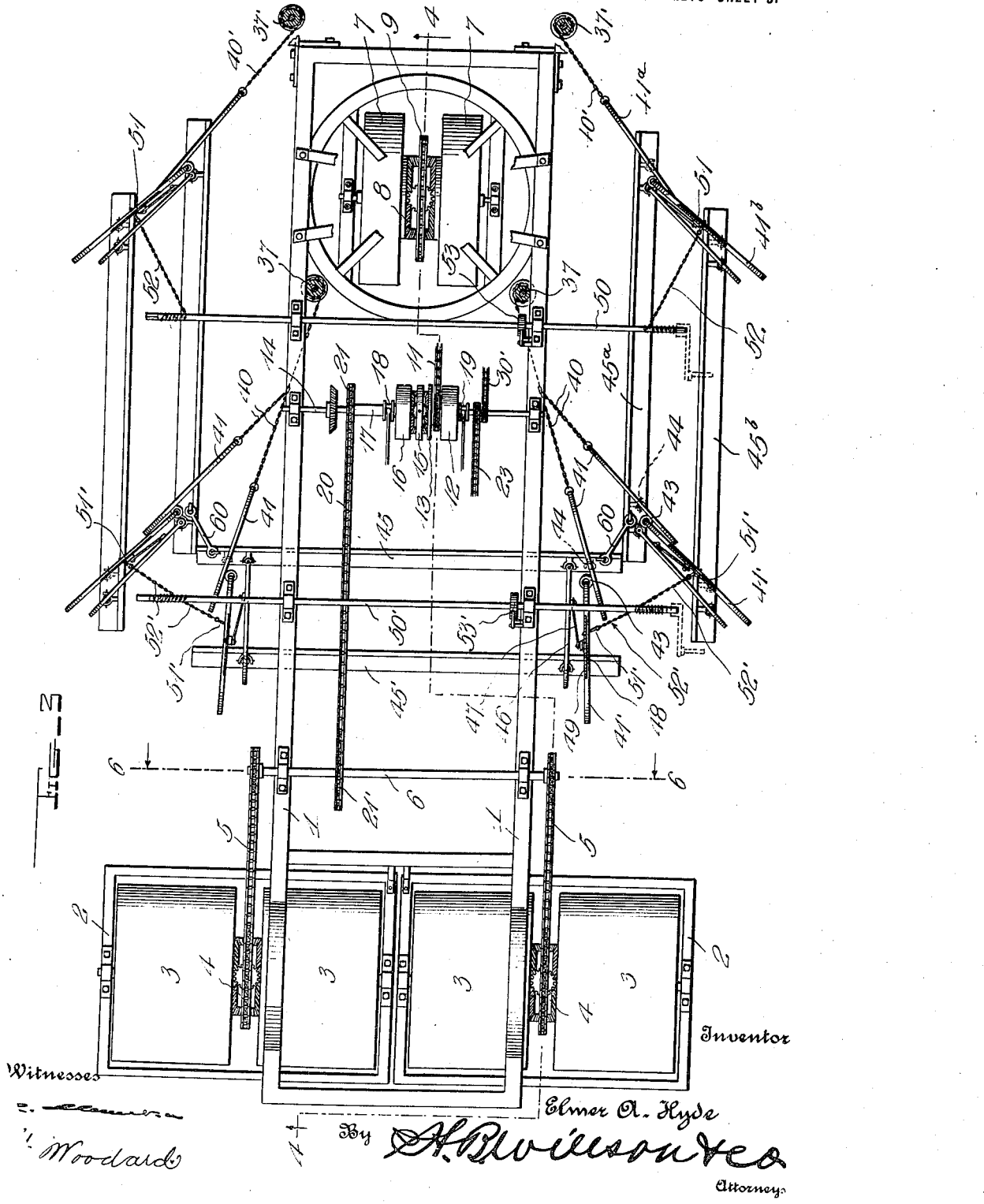

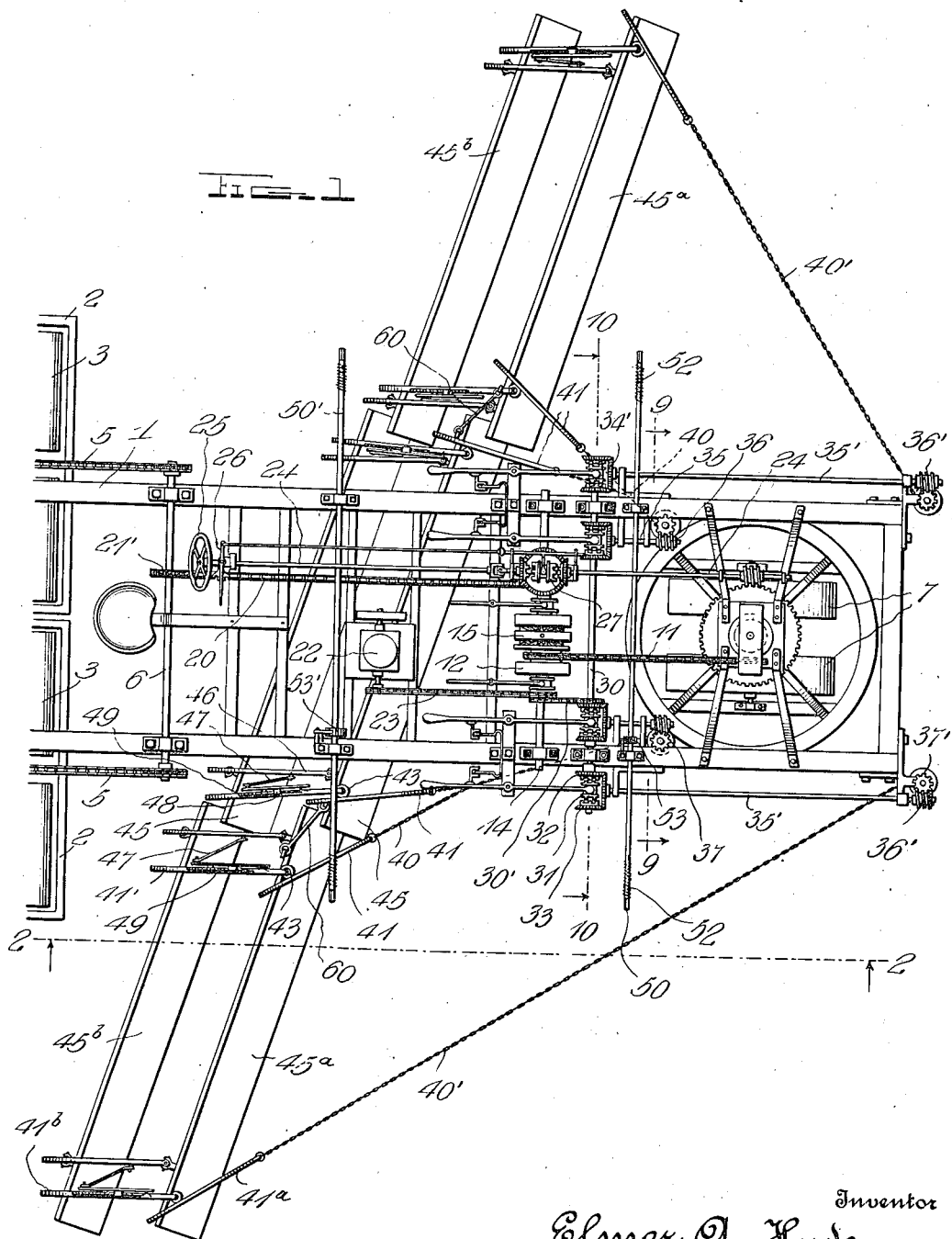

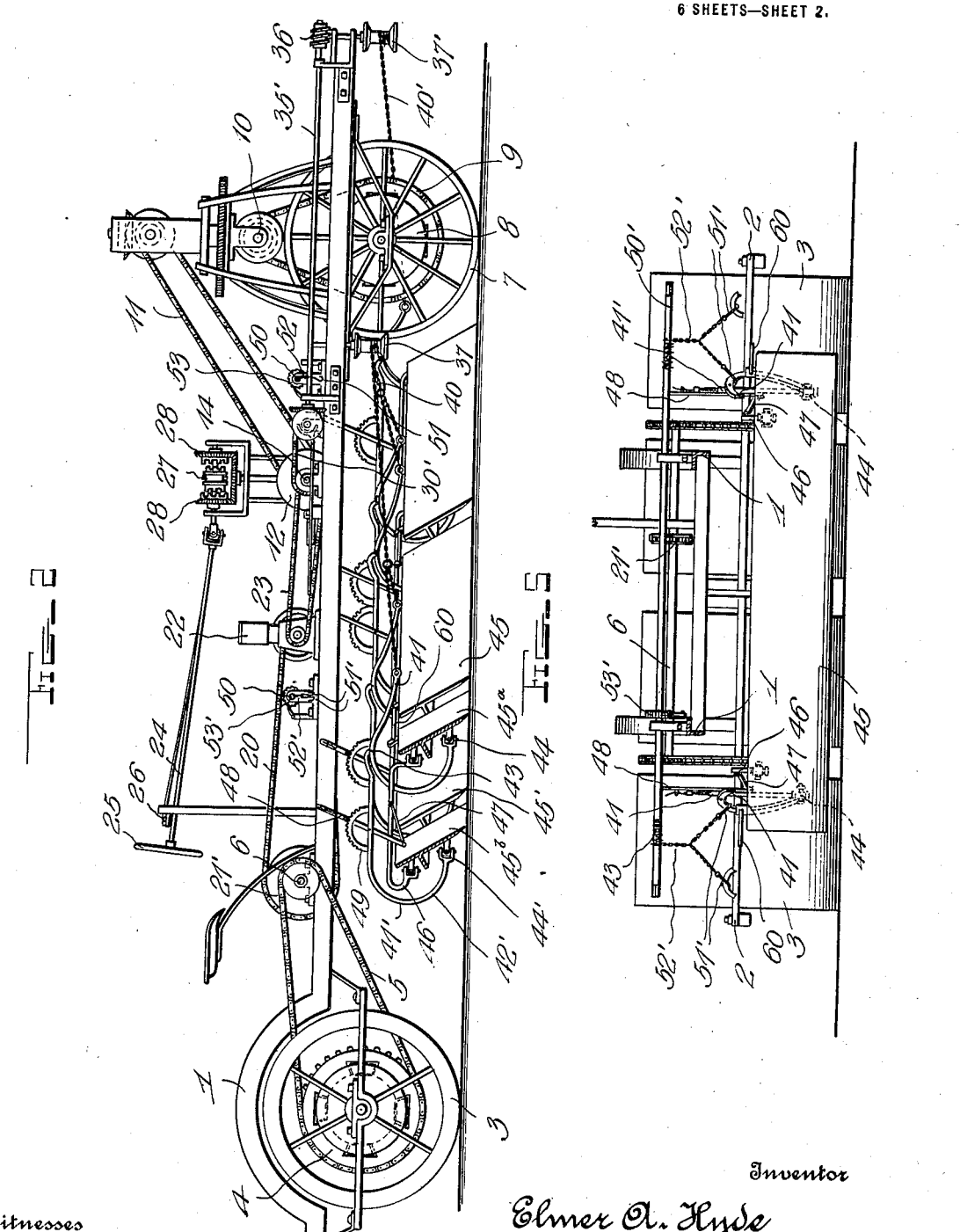

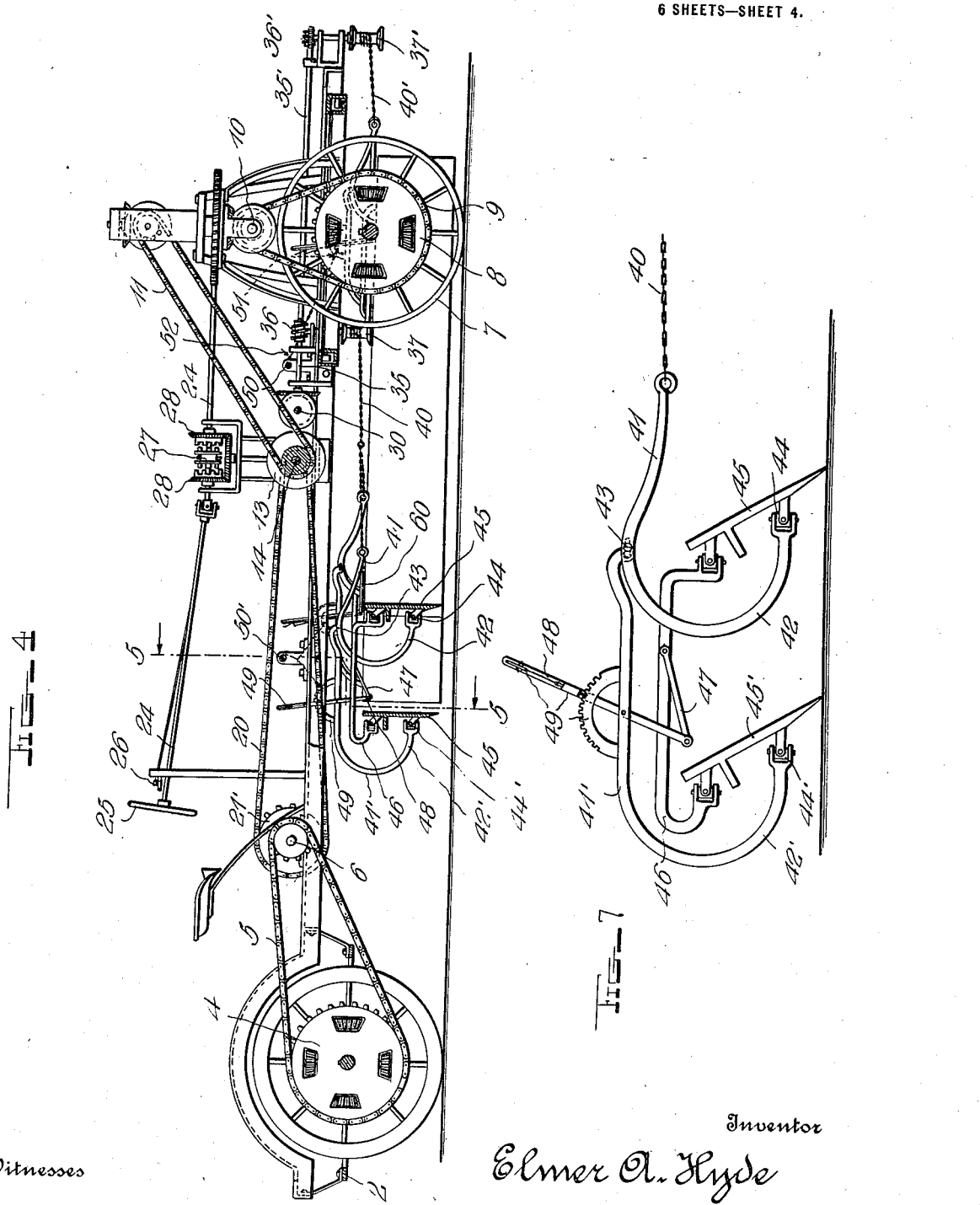

E. A. HYDE.
ROAD GRADING MACHINE.
APPLICATION FILED FEB. 11, 1915.
1,170,269.
Patented Feb. 1, 1916.
6 SHEETS—SHEET 5.
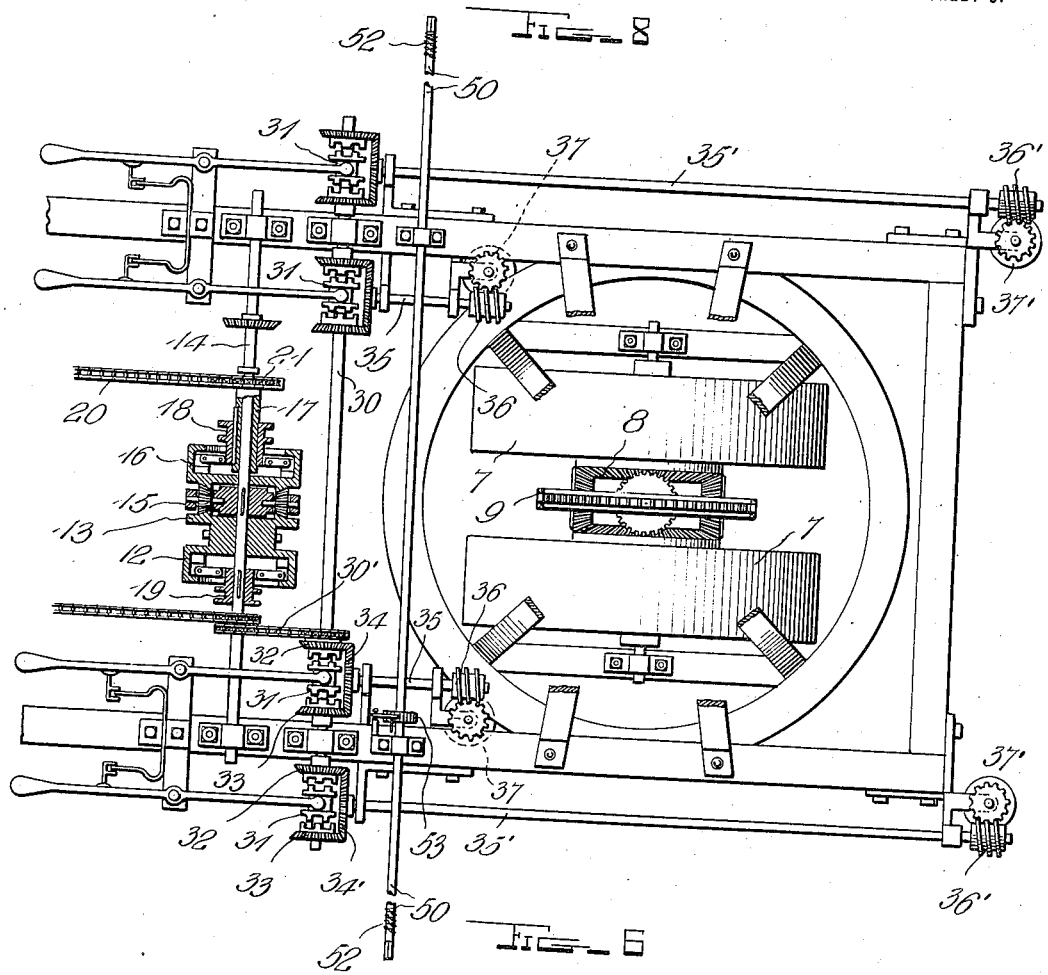
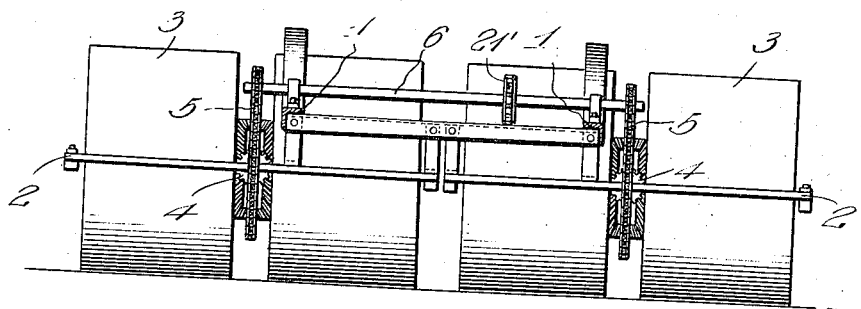
Witnesses
Inventor
Elmer A. Hyde
By H. B. Willson & Co
Attorneys

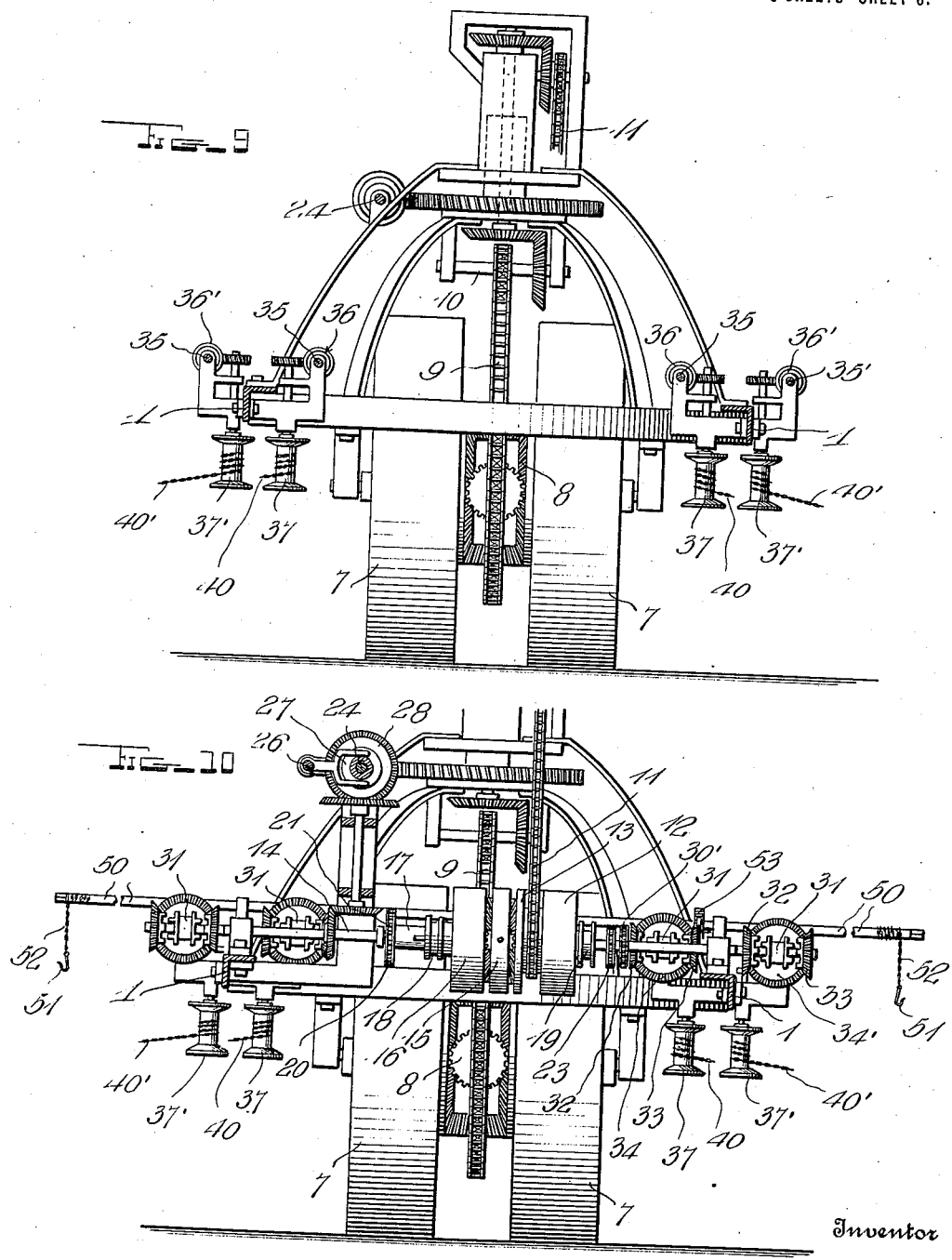

UNITED STATES PATENT OFFICE.

ELMER A. HYDE, OF VILLISCA, IOWA.

ROAD-GRADING MACHINE.

1,170,269.  Specification of Letters Patent.  Patented Feb. 1, 1916.

Application filed February 11, 1915. Serial No. 7,519.

*To all whom it may concern:*

Be it known that I, ELMER A. HYDE, a citizen of the United States, residing at Villisca, in the county of Montgomery and State of Iowa, have invented certain new and useful Improvements in Road-Grading Machines; and I do declare the following to be a full, clear, and exact description of the invention, such as will enable others skilled in the art to which it appertains to make and use the same.

My invention relates to improvements in grading machines, and more particularly to those adapted for road grading.

The object of the invention is to improve upon the general construction of machines of this character to the extent hereinafter described and claimed and shown in the drawings wherein:

Figure 1 is a top plan view of a grading machine constructed in accordance with the invention; Fig. 2 is a side view partly in section, this view being taken substantially along the plane of the line 2—2 of Fig. 1; Fig. 3 is an enlarged plan view showing the endmost sections of the grading blades in folded position; Fig. 4 is a longitudinal section of the machine with the blades in this position, this view being taken substantially on the plane indicated by the line 4—4 of Fig. 3; Fig. 5 is a vertical transverse section as seen along the plane of the line 5—5 of Fig. 4; Fig. 6 is a similar view taken along the plane indicated by the line 6—6 of Fig. 3; Fig. 7 is a detail vertical longitudinal section on an enlarged scale, showing more particularly the connections between and the adjusting means for the front and rear grading blades; Fig. 8 is an enlarged top plan view of the front end of the machine, parts being in horizontal section; and Figs. 9 and 10 are vertical transverse sections taken along the planes indicated respectively by the lines 9—9 and 10—10 of Fig. 1.

In these drawings, constituting a part of the application, the numeral 1 designates a main supporting frame whose rear end is supported by supplemental frames 2 in which rollers 3 are revolubly mounted, two pairs of these rollers being here shown, and the two rollers of each pair being connected by differentials 4 from which chains 5 lead forwardly to sprockets carried by the opposite ends of a driven transverse shaft 6. The front end of the frame 1, however, may be supported upon any suitable wheels 7 which are mounted to turn laterally for the purpose of guiding the machine. In the present case, these wheels are shown as connected by a differential 8 from which a chain 9 rises to a sprocket fast on a horizontal shaft 10, this shaft being driven through the instrumentality of appropriate gearing, by a chain 11 which extends forwardly from one section 12 of a differential 13, this differential being mounted upon a transverse shaft 14 upon which the member 12 is loosely mounted, while the central section 15 of the differential is keyed to said shaft, the other section 16 thereof being likewise loose on the shaft but being capable of being locked to the sleeve 17 which is loose thereon, by an appropriate clutch member 18 keyed to said sleeve. A similar clutch member 19 is slidably keyed upon the shaft 14 for coaction with the member 12 to lock the same upon said shaft as will be evident by an inspection of Fig. 8 of the drawings. It therefore follows, that when both of the clutch members 18 and 19 are thrown to active position, the sprocket on the member 12 will drive the chain 11 to impart rotary movement to the two front wheels 7, while the sleeve 17 will also be driven, this sleeve now driving the rear shaft 6 through the instrumentality of the sprocket chain 20 which passes around sprockets 21 and 21' keyed respectively on said sleeve and said shaft. It is to be understood, however, that the shaft 14 upon which the two clutch members 18 and 19 are keyed, is driven by an appropriate type of gasolene engine 22 being here shown as connected with the shaft 14 by a sprocket chain 23, for this purpose.

In connection with the parts so far described, I provide a longitudinally extending steering rod 24 which is adapted to turn the front wheels 7 when it is desired to steer the machine, the rear end of this rod being provided with a hand wheel 25 for this purpose, and with a clutch operating lever 26 which is adapted to slide a clutch member 27 longitudinally on said shaft, said member being keyed to the latter and being adapted to be thrown into engagement with a pair of clutch members carried by bevel gears 28 which are mechanically driven in opposite directions, by any appropriate means forming no part of the present invention. By this means, it will be evident that the steering rod 24 may be rotated by power transferred from the engine 22 rather than by hand, if desired. The specific steering mechanism however, has no bearing whatever on the subject matter of the present application, and is merely shown as a matter of preference.

Immediately in advance of the transverse shaft 14, is an additional transverse shaft 30 which is driven by a chain 30' from said shaft 14. Each end of this shaft 30 is provided with a pair of clutch members 31 which are slidably keyed thereon and which are adapted for engagement with clutch members carried by inner bevel gears 32 or with such members carried by outer bevel gears 33, two gears 32, and two gears 33 being shown as disposed at each side of the machine, all of said gears being loose on the shaft 30. Furthermore, one gear 32 and one gear 33 at each side of the machine meshes with a bevel gear 34 keyed on a longitudinally extending shaft 35, while the remaining gears 32 and 33 at each side of the machine mesh with opposite sides of an additional bevel gear 34' which is keyed on a revolubly mounted longitudinal shaft 35'.

Since the structure just described, is duplicated at each side of the machine, it follows that two shafts 35 and two shafts 35' are provided, the former being equipped with worms 36 on their front ends, which worms are located at points comparatively close to the shaft 30, while the forward ends of the latter are provided with worms 36' which are located beyond the front corners of the frame 1. From the two rear worms 36, a pair of drums 37 are driven, while the worms 36' in turn actuate drums 37', all of these drums being disposed in planes below the main frame 1 as clearly disclosed in the various figures of the drawings. It may be well to here describe that as long as the clutch members 31 are retained in neutral position, the worms 36 or the drums 37 will not be rotated, but the moment said members 31 are shifted into engagement with the clutch members of the gears 31 or 32, the same will be rotated, thus driving the shaft 35, or 35' as the case may be, in one direction or the other according to the direction in which the member 31 is shifted. It will therefore be seen that the amount of rotation of the drums 37 and 37' and the direction of rotation thereof, is under full control of the operator of the machine. This is important for reasons to hereinafter become evident.

Leading rearwardly from the two rearmost drums 37, is a pair of chains 40 whose rear ends are forked as most clearly seen in Figs. 1 and 3, the terminals of said forked rear ends being connected to the free ends of two pairs of draft beams 41, one pair of such beams being disposed at each side of the machine. As clearly disclosed in Figs. 4 and 7 for instance, the rear ends of the draft beams 41 are bent downwardly and forwardly as seen at 42, while the intermediate portions of said beams are pivoted at 43 to the front ends of additional draft beams 41' whose rear ends are curved downwardly and forwardly as disclosed at 42'. One of the beams 41 at each side of the machine, is pivoted by a two-way hinge member 44 to a suitable upright transversely extending grading blade 45 whose lower edge is preferably sharpened as shown (see more particularly Figs. 1, 3, 4 and 7), while the beams 41' which extend rearwardly from the beams 41 connected to the blade 45, are hinged by two-way hinges 44' to the rear side of a rear or follower grading blade 45'. In the present case, the upper edge portions of the two blades 45 and 45' are shown as connected by links 46 whose opposite ends are hinged thereto by two-way hinges, these links being disposed beneath the beams 41' and being pivotally connected to the forward ends of downwardly and rearwardly inclining links 47 whose rear ends are pivoted to the lower ends of upright adjusting levers 48, these levers being fulcrumed to the beams 41' and being adapted to be adjustably held against movement in respect thereto, by a pawl and rack mechanism 49. It follows, however, that actuation of this lever 48 will vary the upright positions of the blades 45 and 45' in the manner shown in Figs. 4 and 7 for instance. The remaining beams 41 and 41' at the two sides of the machine, are connected in the manner above described to the inner ends of end grading blades 45$^a$ and 45$^b$ respectively, the latter being disposed in rear of the former. Furthermore, the adjusting means previously described (including the lever 48 and the parts coacting therewith) is preferably provided in conjunction with said blades 45$^a$ and 45$^b$. Connected to the outer ends of these blades 45$^a$ and 45$^b$, are additional front and rear draft beams 41$^a$ and 41$^b$ respectively, these beams being connected to the outer ends of said blades by two-way hinges in a manner which will be clear by an inspection of the drawings when taken in connection with the description of the connections previously described. As is the case with the inner ends of the blades 45$^a$ and 45$^b$, their outer ends are likewise provided with adjusting means identical with the means previously described in connection with the two ends of the blades 45 and 45'.

Leading forwardly and rearwardly from the front ends of the two beams 41$^a$ is a pair of chains or cables 40' whose lower ends are connected in any appropriate manner to the drums 37'. By this means, the drums 37' may be rotated by the means before described to swing the blades 45$^a$ and 45$^b$ inwardly and forwardly from the position seen in Fig. 1 to that seen in Fig. 3, and the rear drums 37 may be actuated to position the blades 45 and 45′ in planes running straight across the main frame 1 as seen in Fig. 3. With the parts located in this manner, what are now the front ends of the blades 45$^a$ and 45$^b$ lie beneath a transverse winding shaft 50 whose ends are preferably squared for the reception of cranks (shown in dotted lines in Fig. 3). Depending from these shafts and having hooks 51 on their lower ends is a pair of hoisting chains 52, the hooks 51 being adapted to be engaged with one of the draft beams 41$^a$ and 41$^b$ as the case may be, or with another appropriate part located at the forward ends of the blades 45$^a$ and 45$^b$. It will therefore be evident that when the shaft 50 is rotated by means of its crank or otherwise, the chains 52 will be wound thereon, thereby raising the front ends of said blades 45$^a$ and 45$^b$. As it is expedient to provide some means for preventing retrograde movement of the shaft 50, and as a pawl and ratchet mechanism is probably the most simple means for accomplishing this result, I have shown such a mechanism at 53 in the drawings.

Simultaneously with the positioning of the front ends of the blades 45$^a$ and 45$^b$ beneath the winding shaft 50, their rear ends and the blades 45 and 45′ are positioned beneath a rear transverse winding shaft 50′ from whose ends forked chains 52′ having hooks 51′ depend, said hooks being adapted for engagement with suitable parts of the grading mechanism. It therefore follows that when the shaft 50′ is rotated by the provision of a crank or other suitable device, the rear ends of the blades 45$^a$ and 45$^b$ and the entire blades 45 and 45′, will be raised from the earth. In the present instance, a pawl and ratchet mechanism 53′ is illustrated for the purpose of preventing retrograde movement of the shaft 50′.

Although it is evident from the drawings, it may be well to here explain that the inner ends of the endmost grading blades (the blades 45$^a$ and 45$^b$) are disposed substantially end to end and in alinement with the blades 45 and 45′, when the machine is applied to use, in which position they are retained by links 60 which become hinges in effect, for hingedly connecting the inner ends of the blades 45$^a$ with the two ends of the blade 45. It is around these links or hinges 60, that the entire end sections of the grading device swing when said sections are folded inwardly into the position seen in Fig. 3.

Particular emphasis is laid upon the fact that the central section of the grading device, (blades 45 and 45′) and the two end sections (blades 45$^a$ and 45$^b$) may be adjusted independently of each other, since by this means, the two endmost sections may be positioned as seen in Fig. 1, may be swung inwardly to that position seen in Fig. 3 when it is necessary to have the machine of the narrowest width possible, or may be disposed in forwardly diverging relation to each other, for the purpose of drawing the earth inwardly to the center of the road bed. Furthermore, it will be seen that the upright positions of the various grading blades of the three sections may be varied independently of each other. This is likewise advantageous since the blades may be caused to travel a greater or less distance into the road bed for obvious reasons.

In the foregoing description, I have described a number of mechanical details which are preferably employed in connection with a machine of the class set forth, and in the drawings, I have shown such details, but it will be evident that I need not be limited to any features of construction otherwise than as specified in the appended claims.

I claim:—

1. A grading machine comprising a portable frame, combined with a plurality of substantially alined grading blades extending transversely of the frame, means hingedly connecting the adjacent ends of the several blades, draft connections between the latter and the frame, means to swing the various blades forwardly and rearwardly around their hinges, and additional means to vary the upright positions of said blades.

2. A grading machine comprising a portable frame, combined with a plurality of substantially alined grading blades extending transversely of the frame, means hingedly connecting the adjacent ends of the several blades, draft connections between the blades and the frame, means to swing the various blades forwardly and rearwardly around their hinges, and additional means to independently vary the upright positions of the independent blades.

3. A grading machine comprising a front and a rear grading blade, a draft beam hinged by a two-way hinge to the front blade, an additional draft beam leading rearwardly from the first named beam, and hinged by a two-way hinge to the rear grading blade, and means to vary the upright positions of the two blades.

4. A grading machine comprising a front and a rear grading blade, a draft beam hinged by a two-way hinge to the front blade, an additional draft beam leading rearwardly from the first named beam and hinged by a two-way hinge to the rear grading blade, means to vary the upright positions of the two blades, and additional means to move one of the draft beams forwardly and rearwardly.

5. A grading machine comprising a front and a rear grading blade, a draft beam hinged to the front blade by a two-way hinge, an additional draft beam leading rearwardly from the first named beam and hingedly connected to the rear blade by a two-way hinge, a link connecting the two blades, and a lever operating in conjunction with the link and with one of the beams for adjusting the former forwardly and rearwardly to rock the blades around their hinges.

6. A grading machine comprising a front and a rear grading blade, a draft beam hinged to and projecting forwardly from the front blade, an additional draft beam leading rearwardly from the first beam and hinged to the rear blade, a link pivoted at its ends to the two blades and a lever operating in conjunction with said link and one of said beams to adjust the former forwardly and rearwardly to rock the blades around their hinges.

7. A grading machine comprising a front and a rear grading blade, a draft beam hinged to and projecting forwardly from the front blade, an additional draft beam pivoted to and leading from the first beam, said additional beam being hinged to the rear blade, a link pivoted at its ends to the two blades, and a lever operating in conjunction with said link and one of said blades to adjust the former in order to rock the blades around their hinges.

In testimony whereof I have hereunto set my hand in presence of two subscribing witnesses.

ELMER A. HYDE.

Witnesses:
 GEO. RORGUHER,
 HARRY E. MOORE.